United States Patent

Hulyalkar

[11] Patent Number: 6,032,261
[45] Date of Patent: Feb. 29, 2000

[54] BUS BRIDGE WITH DISTRIBUTION OF A COMMON CYCLE CLOCK TO ALL BRIDGE PORTALS TO PROVIDE SYNCHRONIZATION OF LOCAL BUSES, AND METHOD OF OPERATION THEREOF

[75] Inventor: Samir N. Hulyalkar, Bensalem, Pa.

[73] Assignee: Philips Electronics North America Corp., New York, N.Y.

[21] Appl. No.: 09/000,672

[22] Filed: Dec. 30, 1997

[51] Int. Cl.[7] .............................. G06F 13/42; H04L 7/00
[52] U.S. Cl. ...................... 713/400; 710/129; 710/131; 713/600
[58] Field of Search .................................. 710/129, 131; 713/400, 500, 501, 502, 600

[56] References Cited

U.S. PATENT DOCUMENTS

| | | | |
|---|---|---|---|
| 5,799,207 | 8/1998 | Wang et al. | 710/38 |
| 5,831,805 | 11/1998 | Sekine et al. | 361/86 |
| 5,838,876 | 11/1998 | Iwamura | 386/125 |
| 5,848,367 | 12/1998 | Lotockey et al. | 701/36 |
| 5,883,621 | 3/1999 | Iwamura | 345/327 |
| 5,909,559 | 6/1999 | So | 710/127 |

*Primary Examiner*—Xuan M. Thai
*Attorney, Agent, or Firm*—Gregory L. Thorne

[57] ABSTRACT

A bus bridge for interconnecting a plurality of buses, which bridge includes a plurality of bridge portals, each portal being coupled to a respective one of the buses, and further includes a plurality of switching subsystems, each of which is coupled to a respective one of the bridge portals. The plurality of switching subsystems collectively constitute a switching system which interconnects the plurality of bridge portals. The bus bridge further includes a plurality of cycle clock subsystems, each of which is operatively associated with a respective bridge portal and the respective switching subsystem coupled thereto. Each cycle clock subsystem includes a cycle clock generator which generates a cycle clock, and a cycle counter which receives the cycle clock at a reset input thereof and produces a cycle count output which constitutes a common timing reference for the respective switching subsystem and the respective bridge portal. The bus bridge is preferably an IEEE 1394 serial bus bridge. Various specific implementations of the switching subsystems and bridge portals are disclosed.

27 Claims, 6 Drawing Sheets

BUS BRIDGE WITH DISTRIBUTION OF A COMMON CYCLE CLOCK TO ALL BRIDGE PORTALS TO PROVIDE SYNCHRONIZATION OF LOCAL BUSES, AND METHOD OF OPERATION THEREOF

BACKGROUND OF THE INVENTION

The present invention relates generally to bus bridges, and more particularly, to a method and apparatus for distributing a cycle clock to a plurality of serial bus nodes (bridge portals) of a plurality of IEEE 1394 serial local buses.

The IEEE 1394 standard (hereinafter sometimes referred to simply as "IEEE 1394") defines a serial bus technology for interconnecting consumer electronics and computer products, such as digital TV, PCs, digital VCRs, digital camcorders, printers, fax machines, etc. IEEE 1394 (sometimes referred to as "firewire") is currently the most widely-accepted high-speed digital interconnect technology for connecting consumer electronics and computer products, as it is low-cost, flexible, and easy-to-use. The basic IEEE 1394 standard defines serial data rates of 100 Mbps, 200 Mbps, and 400 Mbps. A new IEEE 1394 sub-group (known as "IEEE p1394.b") is currently working on a backward-compatible extension to serial data rates of up to 3.2 Gbps. IEEE 1394 can support both asynchronous and isochronous data, thus making it ideally suitable for multimedia applications. It is stated in the April 1997 issue of *IEEE Spectrum* that "[w]hen the information superhighway goes multimedia, experts predict that 1394 will pave the highway's first and the last 3 meters."

IEEE 1394 currently defines a maximum wired distance or length of 4.5 meters. Thus, intrinsically, an IEEE 1394 serial bus can only be used to interconnect components which are relatively close together. Such a system of interconnected components which are close together is commonly referred to as a "cluster". An exemplary cluster in a residential environment is a "multimedia island" such as a home entertainment cluster, a home computing cluster, a bedroom cluster, etc.

Figure 1:
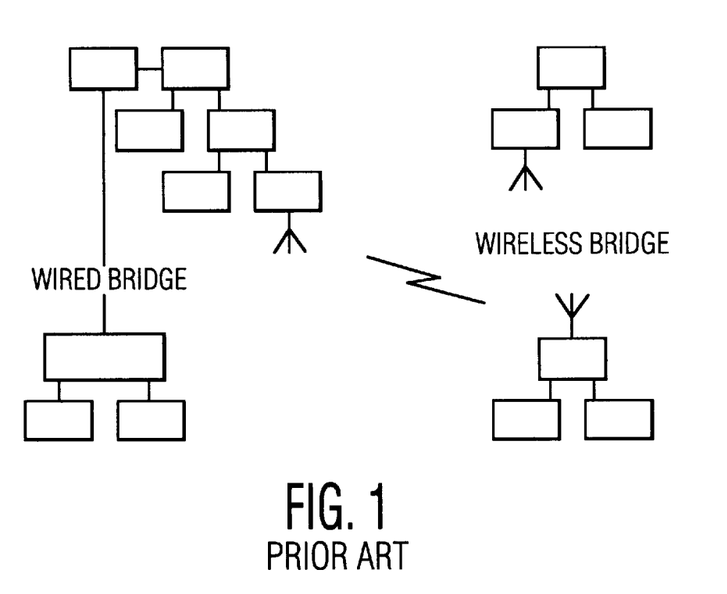
FIG. 1 is a block diagram which depicts wired and wireless interconnections of IEEE 1394 clusters.

As depicted in FIG. 1, it is possible to interconnect clusters via a wired or wireless connection. Presently, there are two main approaches to extending the IEEE 1394 serial bus within a wired infrastructure. One approach, currently under consideration by the IEEE p1394.b sub-group, is to extend the IEEE 1394 serial bus by using plastic-optical-fiber (POF) or unshielded twisted pair (UTP Category 5) transmission lines to implement a wired long distance. This type of extension can reach a distance of 50–100 meters. Another approach, currently under consideration by the IEEE p1394.1 sub-group, is to extend the IEEE 1394 serial bus by creating a wired "bridge" between two different serial bus segments or clusters.

With continuing reference to FIG. 1, another approach to extending the IEEE 1394 serial bus is to create a wireless "bridge" between clusters. That may promise ease-of-use and the flexibility associated with an IEEE 1394 network. In general, it can be expected that wired IEEE 1394 bridges will be the pre-dominant approach within new residential buildings since IEEE 1394 "outlets" may be installed within every room. However, retrofitting wired IEEE 1394 bridges in existing residences may prove cost-prohibitive for many residences due to the extensive rewiring which will be required. Thus, for such existing residences, wireless IEEE 1394 bridges, if sufficiently low-cost, may provide a suitable alternative. Furthermore, it is expected that both wired and wireless solutions to extending local IEEE 1394 serial buses will co-exist in a complementary fashion within the residential environment.

It should be noted that wireless bridges have inherent drawbacks. Namely, wireless bridges mandate much lower data transmission rates than wired bridges, due to the inherent complexity of implementing high-speed wireless connections. Further, wireless bridges are not cost-effectively scalable to higher data rates vis-a-vis wired bridges. This is primarily because the wireless frequency spectrum is a shared commodity subject to FCC regulations regarding its use. For example, use of the 2.4 GHz band is restricted to spread-spectrum communications, hence restricting the available data rate to be 2–4 Mbps (IEEE 802.11). Higher data rate (about 25–50 Mbps) transmissions are possible using wireless asynchronous transfer mode (WATM) technology. However, such higher data rate transmissions using WATM technology must use the NII band between 5.15–5.35 and 5.725–5.825 GHz, which is significantly more expensive to implement since the RF technology for these frequencies is not yet mature.

From the above, it can be appreciated that wireless IEEE 1394 bridges can use a multiplicity of data rates, thereby imposing a requirement that wireless IEEE 1394 bridges be capable of supporting multiple data rates.

Figure 2:
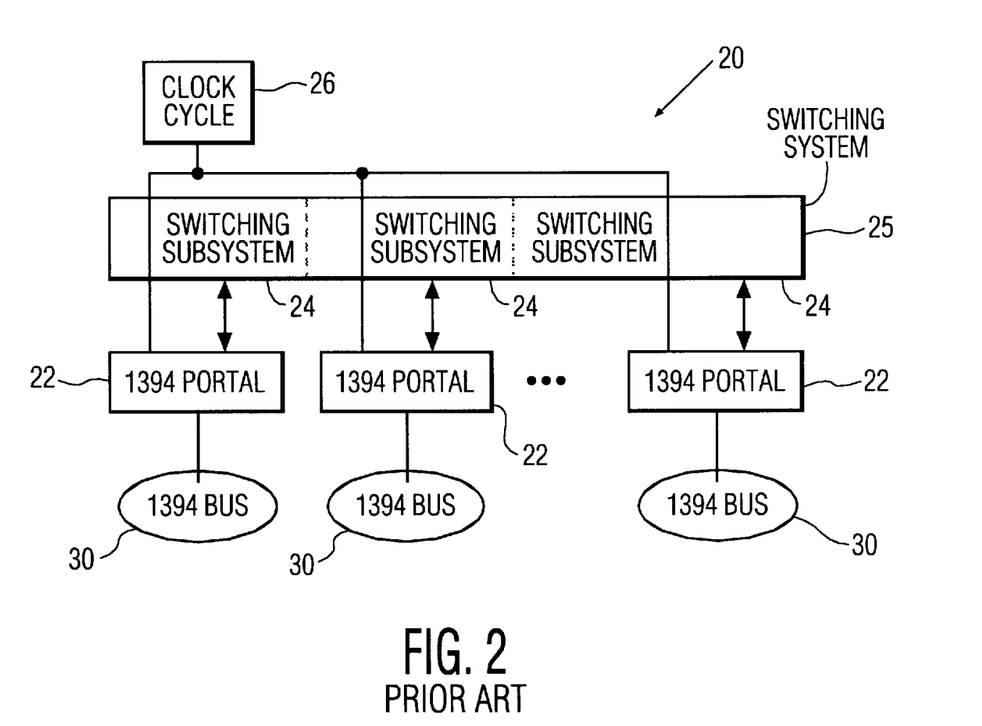
FIG. 2 is a block diagram which depicts the general architecture of an IEEE 1394 serial bus bridge.

With reference now to FIG. 2, the general architecture of an IEEE 1394 bridge will now be described. More particularly, the IEEE 1394 bridge 20 includes two or more bridge portals 22, an implementation-specific switching network 25 having subsystems 24 for the respective bridge portals, and a cycle clock 26. Each bridge portal 22 is a separate serial bus node which responds to serial bus read, write and lock requests from a respective local IEEE 1394 serial bus 30 connected thereto, as described in the document P1394, Draft 8.0v4, Nov. 21, 1995, the disclosure of which is incorporated herein by reference. Each bridge portal 22 monitors all serial bus packets, both asynchronous and isochronous, in order to determine which packets, if any, are to be routed through the switching fabric 24 to another bridge portal 22. The switching network 24 which interconnects the bridge portals 22 is capable of transferring any serial bus packets from one bridge portal 22 to any other bridge portal 22, using wired and/or wireless data transmission means. Within a local IEEE 1394 serial bus, it is necessary that a common cycle clock be distributed to all nodes on that bus. The primary reason for this synchronization requirement is to enable timestamping of real-time data at the source, whereby this timestamp can be used to significantly reduce the timing jitter which arises due to the fact that the network is not always available for transmission (because it is shared).

In a local IEEE 1394 serial bus, a cycle master (or "root node") performs this function. The cycle master is responsible for synchronizing all nodes connected to the local bus to a 125 µs cycle clock. At the start of every cycle, the cycle master sends a special asynchronous packet, called the "cycle_start packet", to each of the nodes. Each cycle_start packet contains the current bus_time, and is written into a cycle time register (CTR) of each node. Because the communication channel may be "busy" at the time the cycle master attempts to send the cycle_start packet (e.g., some user/node may be transmitting some data at that particular time), it is possible that the transmission of the cycle_start packet will be delayed by the time that the cycle master has to wait until the blocking transmission ends and the communication channel becomes available. Because the cycle master has priority over all other nodes, such inevitable delays are minimized. Each node that receives the cycle_ start packet must immediately reset its counter, so that all nodes are synchronized to the same cycle.

This cycle clock must now be transmitted to the nodes of other serial buses via the IEEE 1394 bridge which, as previously discussed, can be implemented using wired or wireless transmission at a multiplicity of possible data rates. Currently, the IEEE p1394.1 sub-group does not consider the transmission of the cycle clock as part of its work, and hence, no documentation is currently available on how to propagate this cycle clock.

As described previously, in an IEEE 1394 bridge, all bridge portals are nodes on respective local IEEE 1394 serial buses. Within one of the IEEE 1394 serial buses connected to the bridge is a so-called "cycle monster", which is a node from which the cycle clock is propagated over all of the serial buses. It should be noted that it is not necessary that the cycle monster be a bridge portal. In general, the bridge portal which is connected to the IEEE 1394 serial bus having the cycle monster is called the "cycle monster portal". It should also be noted that all bridge portals, except possibly the cycle monster portal, are cycle masters.

All of the bridge portals in the IEEE 1394 serial bus bridge must be synchronized to a common cycle clock in order for the bridge to support isochronous routing of real-time data. Thus, what is required is a method of distributing the cycle clock to meet this synchronization requirement while also minimizing the timing jitter resulting from the use of different wired or wireless switching fabrics (which are implementation-specific, and thus, varied). The present invention fulfills these requirements.

SUMMARY OF THE INVENTION

The present invention encompasses, in one of its aspects, a bus bridge for interconnecting a plurality of buses which have a plurality of bridge portals, each of which is coupled to a respective one of the buses, and a plurality of switching subsystems which are respectively coupled to respective ones of the bridge portals. The plurality of switching subsystems collectively constitute a switching network or system which interconnects the plurality of bridge portals. The bus bridge further includes a plurality of cycle clock subsystems, each of which is operatively associated with a respective bridge portal and the respective switching subsystem coupled thereto. Each cycle clock subsystem includes a cycle clock generator which generates a cycle clock, and a cycle counter which receives the cycle clock at a reset input thereof, and which produces a cycle counter output which constitutes a common timing reference for the respective switching subsystem and the associated bridge portal. The bus bridge is preferably an IEEE 1394 serial bus bridge. The switching system can be a wired or wireless switching system which utilizes a frame synchronization protocol. Various specific implementations of the switching subsystems and bridge portals are disclosed.

The present invention encompasses, in another of its aspects, a method for distributing a cycle clock in a serial bus bridge which includes a plurality of bridge portals, each of which is coupled to a respective one of the buses; and also includes a plurality of switching subsystems, each of which is coupled to a respective one of the bridge portals, wherein the plurality of switching subsystems collectively comprise a switching system which interconnects the plurality of bridge portals. The method includes the steps of, generating a cycle clock; at each bridge portal, using a cycle counter to produce a cycle clock count; and, using the cycle clock count as a common timing reference for the both the bridge portal and the respective switching subsystem coupled thereto.

BRIEF DESCRIPTION OF THE DRAWINGS

These and other features, objects, and advantages of the present invention will become more clearly understood from the following detailed description read in conjunction with the attached drawings, in which.

DETAILED DESCRIPTION OF THE INVENTION

Figure 3:
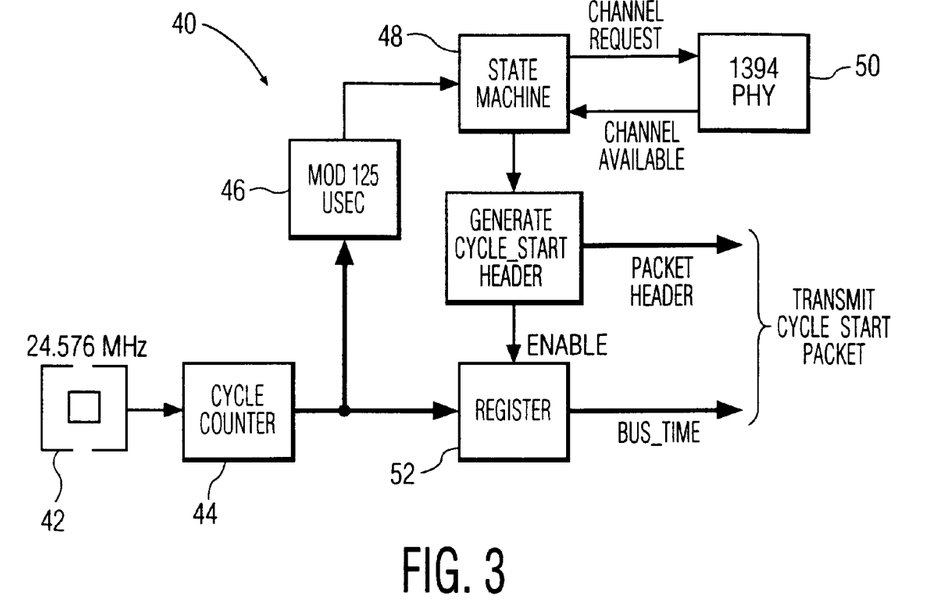
FIG. 3 is a block diagram of a cycle clock subsystem for generating a cycle_start packet at a root node of an IEEE 1394 serial local bus.

With reference now to FIG. 3, a cycle clock subsystem 40 generates the cycle_start packet. Such subsystem is at a root node of a local IEEE 1394 serial bus. It includes a crystal oscillator 42 which runs at a master clock rate of 24.576 MHz and delivers such clock output to a cycle counter 44, which is used to timestamp the IEEE 1394 data packets according to the IEC 1883 standard. The goal is that the cycle clock be distributed to all of the nodes connected to the local IEEE 1394 serial bus in such a manner as to synchronize the cycle counters within all nodes connected to the local IEEE 1394 serial bus. This goal is achieved in the following manner.

The output of the cycle counter 44 is passed through a modulo 125 $\mu$s block 46 which sends a timing signal to a state machine 48 every 125 $\mu$s. Upon receipt of the timing signal the state machine 48 sends a channel request signal to a 1394 physical (PHY) layer 50. As soon as the channel becomes available, the layer 50 sends back a channel available signal to the state machine 48. Upon receipt of the channel available signal, the state machine 48 prepares the packet header for the cycle_start packet, and also sends an enable signal to a register 52, which latches the contents of the cycle counter 44 at the proper instant to generate the bus_time. Some delay in processing can be easily taken into account by properly delaying the delivery of the enable signal to the register 52.

Figure 4:
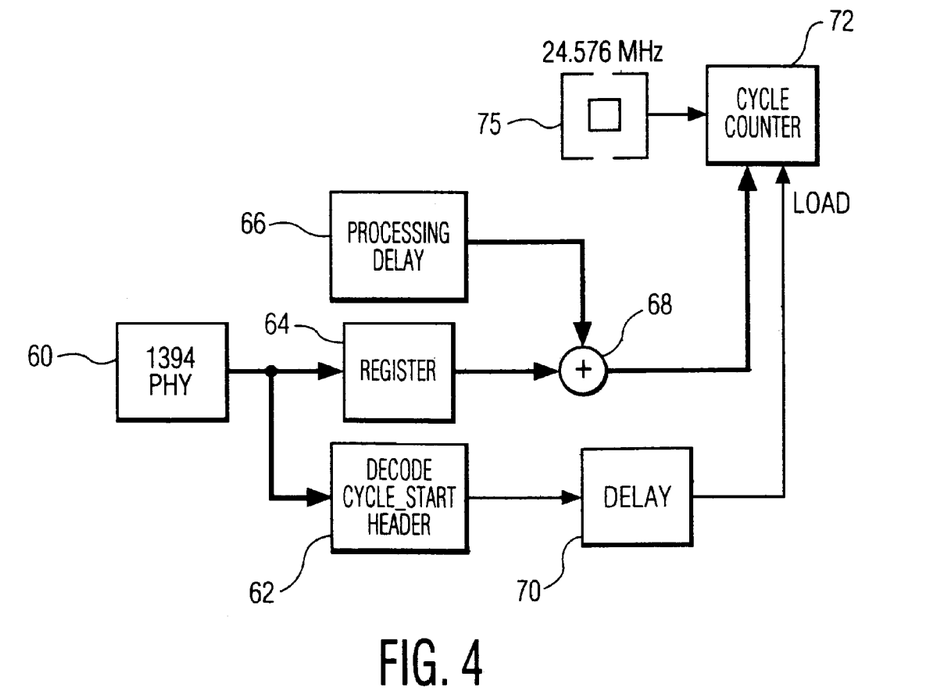
FIG. 4 is a block diagram of a subsystem for processing a cycle_start packet at a receiver node of an IEEE 1394 serial local bus.

At each node which receives the cycle_start packet (which consists of both the packet header and bus_time portions transmitted by the root node), the cycle counter within that receiver node must be set to the appropriate bus_time according to the received cycle_start packet. Such a bus_time reset technique is depicted in FIG. 4. As can be seen in FIG. 4, the 1394 PHY layer 60 of the receiver node receives the cycle_start packet transmitted by the root node, and then sends it to the link layer. The receiver node then decodes the packet header of the cycle_start packet (at block 62) in order to ensure that the received packet is indeed the cycle_start packet. Simultaneously, the bus_time value is loaded into the register 64 of the receiver node. Depending on the processing delay (either for the decoding operation or for the loading of the bus_time value into the register 64), an appropriate processing delay is determined (at block 66). The determined processing delay is added by an adder 68 to the output of the register 64, and the output of the decode cycle_start header block 62 is delayed by a delay element 70 by the determined processing delay. The output of the delay element 70 constitutes a load signal which is applied to the cycle counter 72 of the receiver node. The load signal enables the loading of the sum output by the adder 68 into the cycle counter 72. The cycle counter 72 is reset every 125 $\mu$s by the clock output of the 24.576 MHz crystal oscillator 75 of the receiver node. The resetting of the cycle counter 72 every 125 $\mu$s ensures that the clocks obtained from different crystals in different nodes do not drift significantly with respect to one another. This mechanism limits the timing jitter on MPEG video to 3 bus clock cycles, or about 120 ns.

As was discussed previously, all of the bridge portals in an IEEE 1394 serial bus bridge must be synchronized to a common cycle clock in order for the bridge to support isochronous routing of real-time data. Thus, what is required is a method of distributing the cycle clock to meet this synchronization requirement while also minimizing the timing jitter resulting from the use of different wired or wireless switching fabrics (which are implementation-specific, and thus, varied).

When using a wireless switching fabric to interconnect IEEE 1394 bridge portals, the below-enumerated problems are encountered:

(1) It may not be possible to send the cycle_start packet every 125 $\mu$s, since the overhead for the cycle_start packet will be significant for low data rate transmissions;

(2) The wireless communication channel may not be available at the exact moment that the cycle_start packet needs to be sent. The time that the communication channel is inaccessible could be very large with respect to a wired switching fabric;

(3) It is possible that the cycle monster portal is not the root node; and, (4) All current wireless transmission standards do not operate on a frame basis, although a majority of standards have a concept of frame timing which is synchronized between the different wireless nodes.

As will become clearly apparent hereinafter, the cycle clock distribution method of the present invention solves each of the above-enumerated problems. First, it is assumed that all the wireless standards which are deemed compatible with IEEE 1394 support a frame synchronization mechanism. In this regard, IEEE 802.11 uses periodically spaced beacons as a frame synchronization mechanism. A similar method using timestamps has been proposed for wireless ATM (WATM), which is called "HIPERLAN 2" in Europe. Wireless cellular standards such as GSM, DECT, IS-95, IS-54, and IS-136 also use frame-based timing. Perhaps the one major wireless standard which does not use frame-based timing is HIPERLAN 1. However, given the small population of devices based on this standard, it is quite possible that HIPERLAN 1 may never gain widespread acceptance. Thus, the premise (assumption) that only those wireless standards which support a frame synchronization mechanism are deemed compatible with IEEE 1394 for purposes of the present invention is not overly restrictive.

Figure 5:
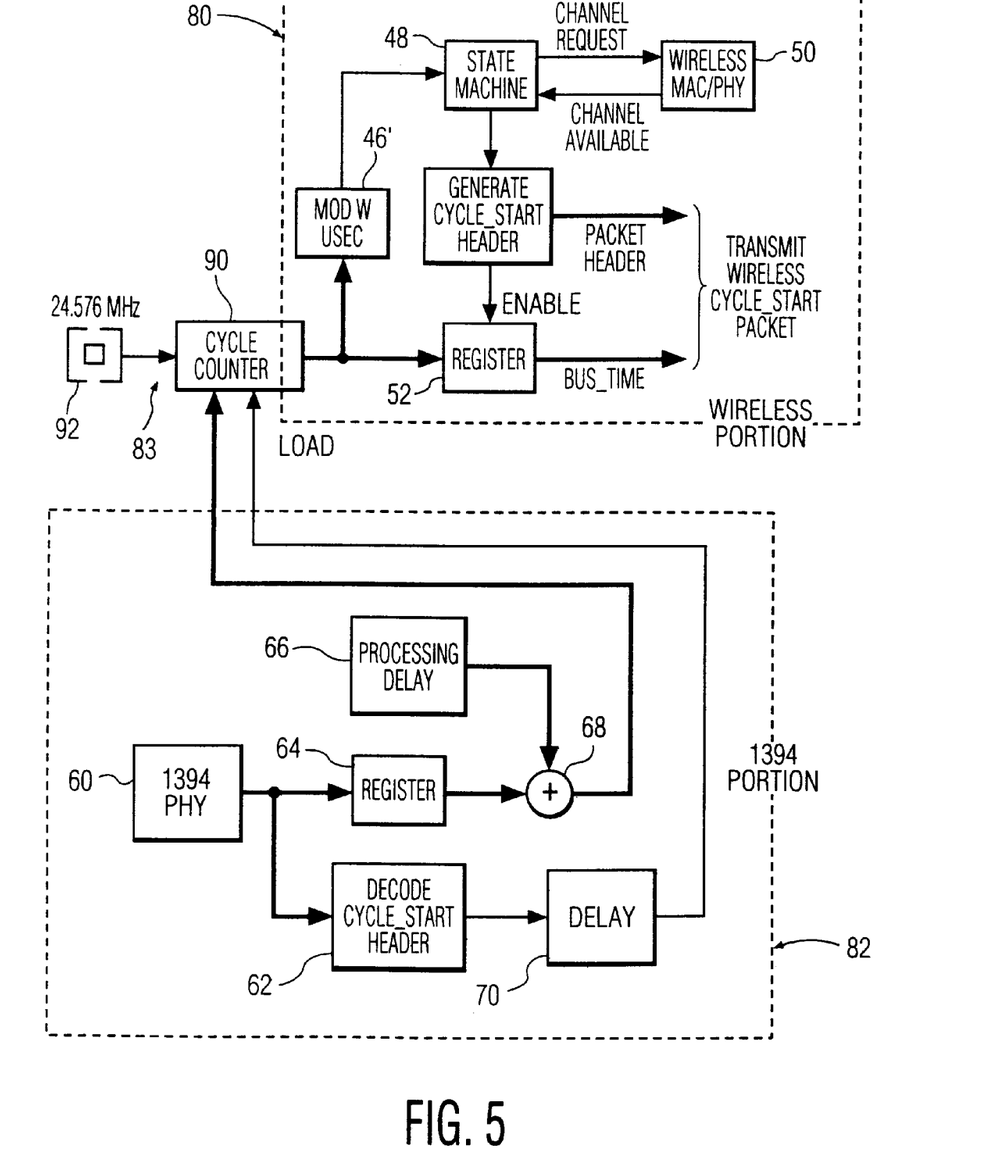
FIG. 5 is a block diagram of a cycle monster portal, wireless switching subsystem, and cycle clock subsystem according to a first preferred embodiment of the present invention.

With reference now to FIG. 5, a method will now be described of distributing the cycle clock at the cycle monster portal in an IEEE 1394 serial bus bridge which employs a wireless switching fabric in accordance with a first preferred embodiment of the present invention. The "wireless portion" 80 in FIG. 5 refers to a wireless switching subsystem which is coupled to the cycle monster portal of the wireless IEEE 1394 serial bus bridge. The "1394 portion" 82 refers to a communications interface portion of the cycle monster portal. In the system depicted in FIG. 5, it is assumed that the cycle monster portal is not a cycle master. It should be noted that, in accordance with the present invention, each of the bridge portals in the IEEE 1394 serial bus bridge (including the cycle monster portal and all "other" bridge portals) will be coupled to a respective wireless (or wired) switching subsystem, as will become clearly apparent hereinafter. Further, it will be recognized that the plurality of switching subsystems coupled to the respective ones of the bridge portals collectively constitute the switching system (i.e., the switching network) of the IEEE 1394 serial bus bridge.

As will be recognized, the wireless portion 80 is virtually identical to the cycle clock subsystem 40 depicted in FIG. 3 and described previously, except that the modulo 125 $\mu$s timer block 46 is replaced with a modulo W $\mu$s timer block 46', where "W" is the cycle$_{13}$time of the wireless portion 80, or more generally, the frame time of the wireless communication standard employed by the wireless portion 80. The 1394 portion 82 is virtually identical to the receiver node processing subsystem depicted in FIG. 4. In accordance with the present invention, both the wireless portion 80 and the 1394 portion 82 are operatively coupled to a common cycle clock subsystem 83 which includes a cycle counter 90 and a 24.576 MHz crystal oscillator 92.

Thus, both the wireless portion 80 and the 1394 portion 82 are essentially slaves of the same cycle clock. In this manner, any additional timing jitter within the wireless portion 80 can be reduced to simply the drift between the clocks of the wireless switching fabric, which is a function of the parameter "W".

It will be appreciated by those skilled in the pertinent art that this cycle clock distribution technique can also be employed in a wired IEEE 1394 serial bus bridge, i.e., an IEEE 1394 serial bus bridge in which a wired switching fabric is employed, whereby the wireless subsystems becomes wired subsystems.

Figure 6:
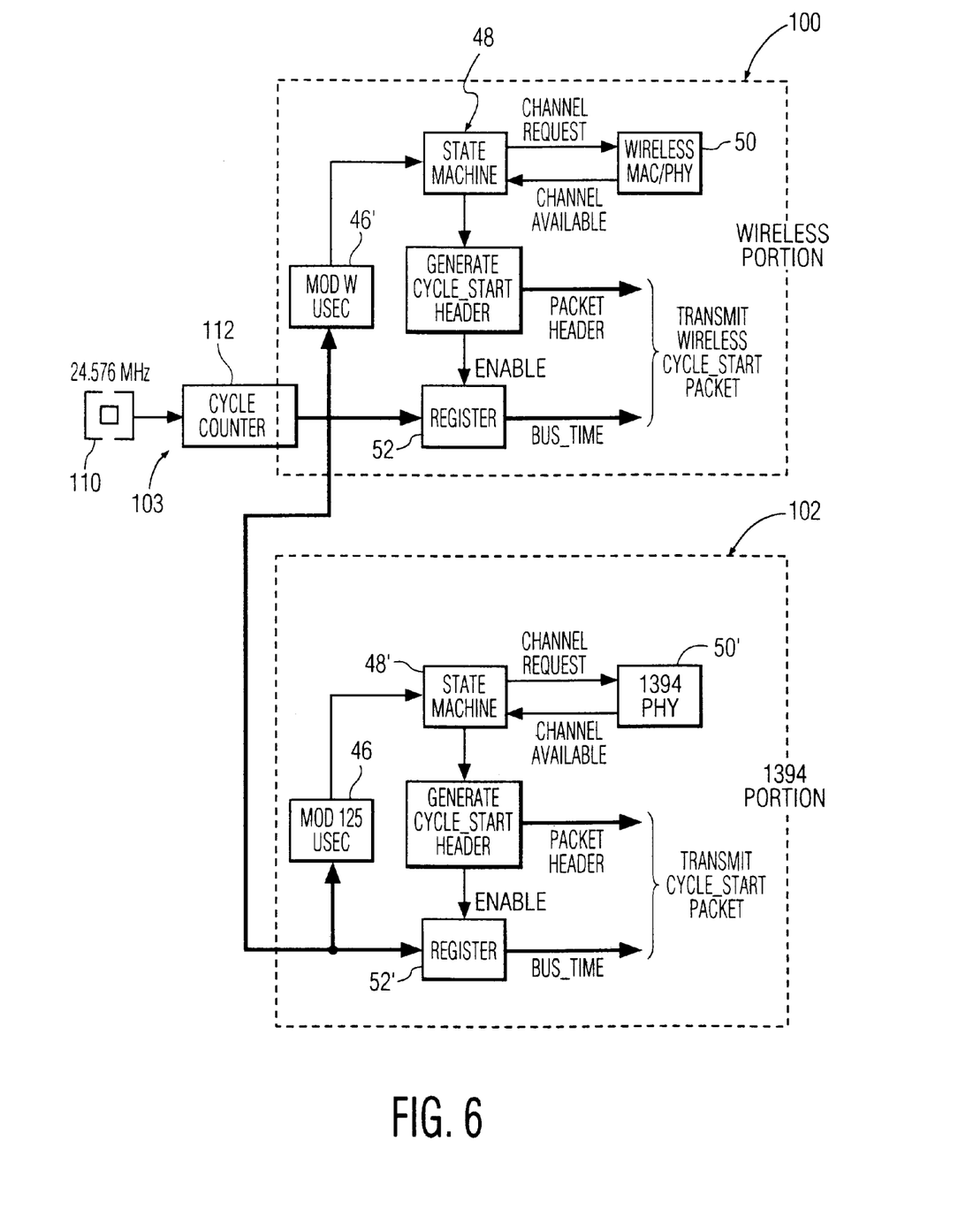
FIG. 6 is a block diagram of a cycle monster portal, wireless switching subsystem, and cycle clock subsystem according to a second preferred embodiment of the present invention.

With reference now to FIG. 6, a method of distributing the cycle clock at the cycle monster portal in an IEEE 1394 serial bus bridge which employs a wireless switching fabric in accordance with a second preferred embodiment of the present invention will now be described. The "wireless portion" 100 in FIG. 5 again refers to a wireless switching subsystem which is coupled to the cycle monster portal of the wireless IEEE 1394 serial bus bridge. The "1394 portion" 102 refers to a communications interface portion of the cycle monster portal of the wireless IEEE 1394 serial bus bridge. In the system depicted in FIG. 6, it is assumed that the cycle monster portal is a cycle master. As will be recognized, the wireless portion 100 is identical to the wireless portion 80 depicted in FIG. 5, and the 1394 portion 102 is essentially identical to the cycle clock subsystem 40 depicted in FIG. 3. The wireless portion 100 and the 1394 portion 102 are both operatively coupled to a common cycle clock subsystem 103 which includes a 24.576 MHz crystal 110 and cycle counter 112.

Figure 7:
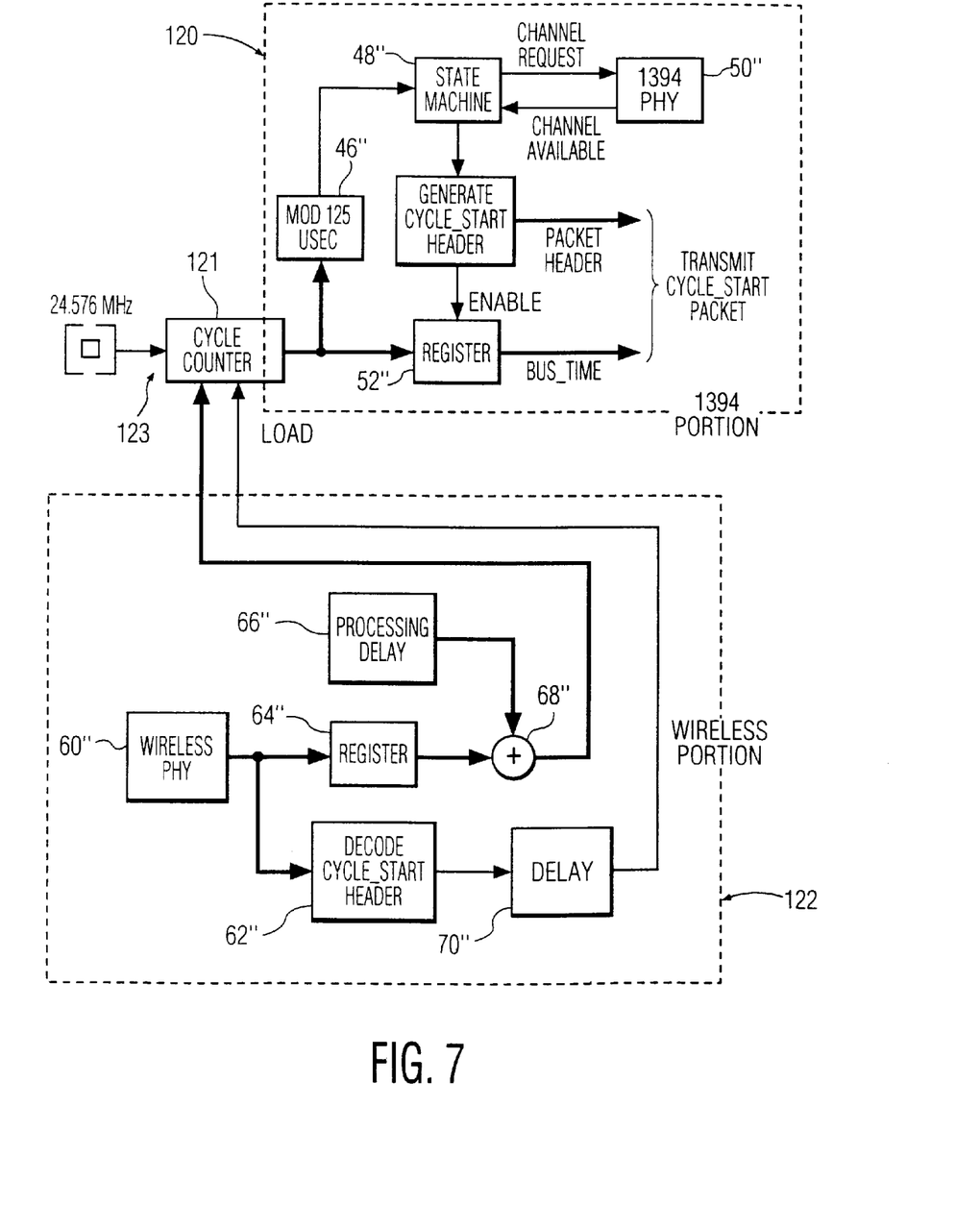
FIG. 7 is a block diagram of another bridge portal, wireless switching subsystem, and cycle clock subsystem according to the present invention.

With reference now to FIG. 7, a method of distributing the cycle clock at the other bridge portals (i.e., other than the cycle monster portal) in an IEEE 1394 serial bus bridge in accordance with a presently preferred embodiment of the present invention will now be described. The 1394 portion 120 refers to the communications interface portion of the respective "other" bridge portal in the IEEE 1394 serial bus bridge, and the wireless portion 122 refers to the wireless subsystem which is operatively coupled thereto. In general, the configuration depicted in FIG. 7 is the same as that depicted in FIG. 5, except that the 1394 and wireless portions 120, 122, respectively, are reversed with appropriate 1394/wireless physical layers. In this case, the wireless portion 122 updates the cycle counter 121 of the respective cycle clock subsystem 123 whenever it receives a new cycle_start packet. As discussed previously, it is possible that the cycle_start packet is received by the wireless portion 122 at a different rate than that of the 1394 portion 120. Since all bridge portals in the IEEE 1394 serial bus bridge are cycle masters (with the possible exception of the cycle monster portal), the wired 1394 portion 120 of each "other" bridge portal always generates the cycle_start packet at the appropriate 125 μs cycle. However, it should be clearly understood that it is not essential to the practice of the present invention that each of the bridge portals be cycle masters of their respective local serial bus.

It is also possible that the wireless/interconnection standards do not support the complete precision of the cycle counter based on a 24.576 MHz clock. For example, IEEE 802.11 supports a clock accuracy of only 1 μs, i.e., it is not possible to send a bus_time which has a sufficient number of bits to represent the 24.576 MHz clock with complete precision. However, in accordance with another aspect of the present invention, it is possible to ensure the complete precision of the cycle counter of each respective cycle clock subsystem even when the wireless/interconnection standards do not support the complete precision of the cycle counter based on a 24.576 MHz clock. More particularly, in accordance with this aspect of the present invention, the cycle counter continues to update itself based on the 24.576 MHz clock, and the lowest significant bits of this clock which cannot be transmitted over the wireless channel are compared to a preset value, for example, all zeroes. The bus_time is sent over the wireless channel only when the lowest significant bits of the cycle counter output equal the preset value. At the receiver, the preset value is loaded within the cycle counter along with the given bus_time, thus ensuring the complete precision of the cycle counter.

Figure 8:
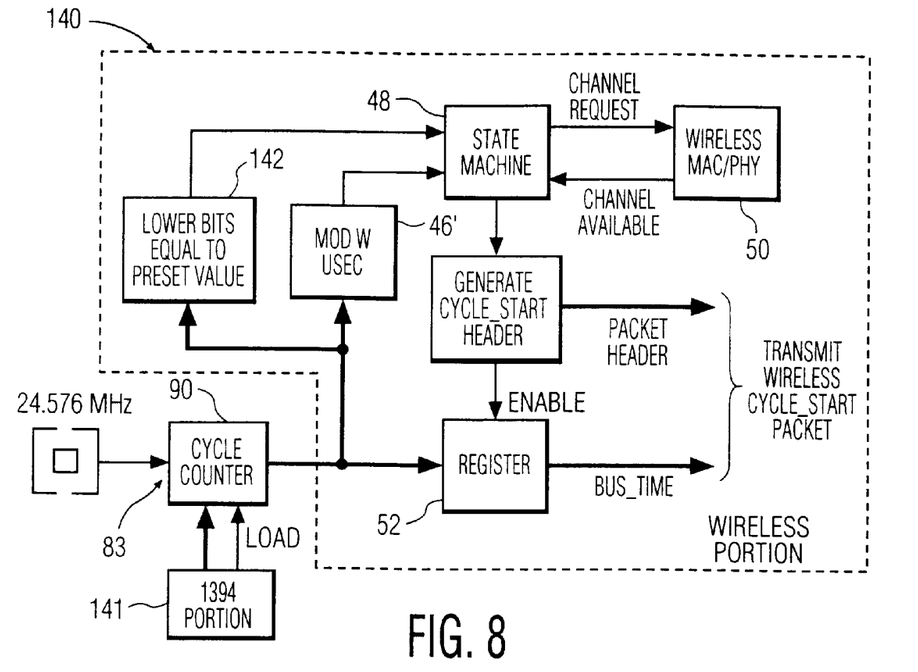
FIG. 8 is a block diagram of a cycle monster portal, wireless switching subsystem, and cycle clock subsystem according to an alternative embodiment of the present invention; and, FIG. 9 is a block diagram of an other bridge portal, wireless switching subsystem, and cycle clock subsystem according to an alternative embodiment of the present invention.
Figure 9:
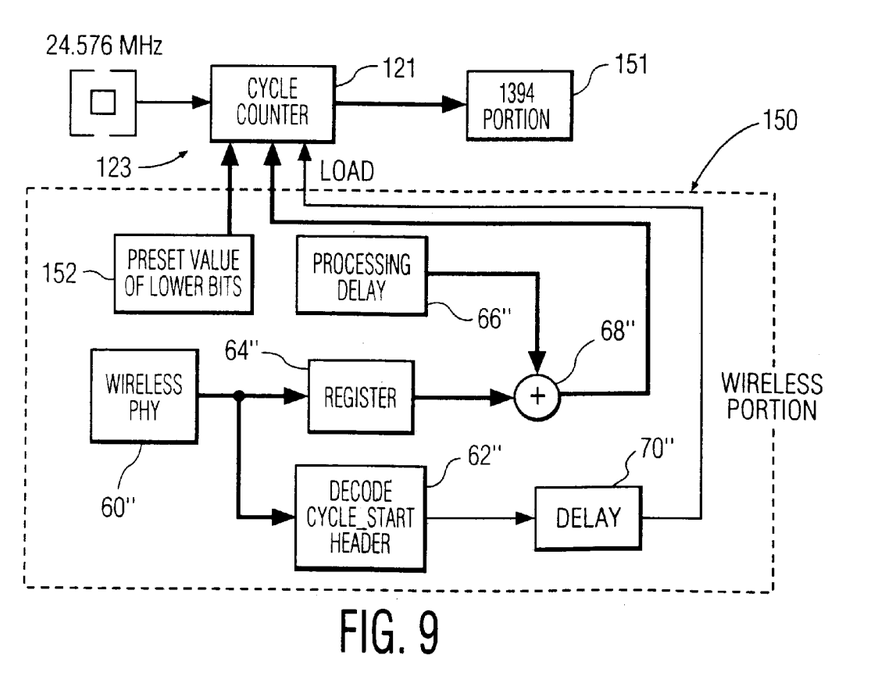

FIG. 8 depicts a block diagram of a sub-system (of an IEEE 1394 serial bus bridge) for generating a wireless cycle_start packet at the cycle monster portal when the complete precision of the cycle counter is not transmitted by the wireless portion in accordance with the above-described aspect of the present invention; and FIG. 9 depicts a block diagram of a sub-system (of an IEEE 1394 serial bus bridge) for receiving a wireless cycle_start packet at other bridge portals (of the IEEE 1394 serial bus bridge) when complete precision of the cycle counter is not transmitted by the wireless portion in accordance with the above-described aspect of the present invention.

The wireless portion 140 of the sub-system depicted in FIG. 8 is identical to the wireless portion 100 depicted in FIG. 6, with the exception that the wireless portion 140 includes an additional processing block 142 for determining when the lower significant bits of the cycle counter output are equal to the preset value, and for generating a trigger signal to initiate the sending of the cycle_start packet by the state machine when an equality is detected. Similarly, the wireless portion 150 of the sub-system depicted in FIG. 9 is identical to the wireless portion 122 depicted in FIG. 7, with the exception that the wireless portion 122 includes an additional processing block 152 for loading the preset value into the cycle counter along with the bus_time extracted from the received cycle_start packet. The 1394 portion 141 of the sub-system depicted in FIG. 8 can be identical to the ones depicted in FIGS. 5 or 6, depending upon whether the cycle monster portal is a cycle master or not. The 1394 portion 151 of the sub-system depicted in FIG. 9 can be identical to the one depicted in FIG. 7.

Based on the above and foregoing, it can be appreciated by those skilled in the pertinent art that the cycle clock distribution methodology of the present invention is not limited to only wireless IEEE 1394 serial bus bridges, but is more generally applicable to all possible implementations of switching fabrics, the only restriction being that the switching fabric support frame-based synchronization. Further, it will be appreciated that the above-described cycle clock distribution methodology of the present invention provides the below-enumerated advantages over the presently available technology:

(1) It can support multiple physical layer standards;
(2) It can support wired or wireless switching fabrics;
(3) It can support different data rates;
(4) Its implementation is simple and generic; and,
(5) It minimizes timing jitter significantly.

Although the present invention has been described in detail hereinabove, it should be clearly understood that many variations and/or modifications of the basic inventive concepts taught herein which may appear to those skilled in the pertinent art will still fall within the spirit and scope of the present invention as defined in the appended claims.

What is claimed is:

1. A bus bridge for interconnecting a plurality of buses, comprising:

a plurality of bridge portals, each bridge portal being coupled to a respective one of the buses;

a plurality of switching subsystems, each coupled to a respective one of the bridge portals and which collectively form a switching system which interconnects the plurality of bridge portals; and a plurality of cycle clock subsystems, each operatively associated with a respective one of the bridge portals and the respective switching subsystem coupled to the associated bridge portal;

wherein each cycle clock subsystem comprises:

a cycle clock generator for generating a cycle clock; and a cycle counter which receives the cycle clock at a reset input thereof, and which produces a cycle count output which constitutes a common timing reference for the respective switching subsystem and the respective bridge portal;

and further wherein the cycle count output generated in one of said subsystems is distributed to the cycle counters of all other of said subsystems to provide a common timing reference for the bridge portals of all of said buses, the bridge portal associated with said one subsystem being a cycle monster portal.

2. The bus bridge as set forth in claim 1, wherein each of the switching subsystems is a wireless switching subsystem and the switching system is a wireless switching system.

3. The bus bridge as set forth in claim 2, wherein the wireless switching system utilizes a frame synchronization protocol.

4. The bus bridge as set forth in claim 1, wherein each of the switching subsystems is a wired subsystem and the switching system is a wired switching system.

5. The bus bridge as set forth in claim 1, wherein:
the bus bridge is a serial bus bridge;
each of the buses is a serial local bus; and,
each of the bridge portals is a node on its respective serial local bus.

6. The bus bridge as set forth in claim 1, wherein:
the bus bridge is an IEEE 1394 serial bus bridge;
each of the buses is an IEEE 1394 serial local bus; and,
each of the bridge portals is an IEEE 1394 serial bus bridge portal.

7. The bus bridge as set forth in claim 1, wherein the cycle monster portal is also a cycle master for all portals of the bus to which the cycle monster portal is coupled.

8. The bus bridge as set forth in claim 1, wherein the switching subsystems and the switching system utilize a frame synchronization protocol.

9. The bus bridge as set forth in claim 1, wherein the switching subsystem coupled to the cycle monster portal includes:
a modulo W μs counter which receives the cycle counter output of the respective cycle clock subsystem and which produces a timing signal every W μs in response thereto, where W is a frame time specified by the frame synchronization protocol;
a state machine which produces an enable signal in response to the timing signal; and,
a register which has a first input which receives the cycle counter output of the respective cycle clock subsystem and a second input which receives the enable signal, whereby the register outputs a bus_time data block in response to the enable signal, the bus_time data block being indicative of a current bus time.

10. The bus bridge as set forth in claim 9, wherein the cycle monster portal includes:
a physical layer which receives the cycle_start packet from its respective switching subsystem;
a decoding section which decodes the packet header of the cycle_start packet and which outputs a decode signal indicative of receipt of the cycle_start packet;
a processing delay section which determines a processing time required to decode the cycle_start packet, and which outputs a processing delay time output indicative of the determined processing time,
a delay element which delays the decode signal by the processing delay time and which outputs a load signal;
a register which receives the bus_time data block and which produces a register output indicative of the current bus_time;
an adder which sums the processing delay time output and the register output, and which outputs the sum; and,
wherein the cycle counter of the respective cycle clock subsystem receives the load signal and the sum is loaded into the cycle counter of the respective cycle clock subsystem in response to the load signal.

11. The bus bridge as set forth in claim 10, wherein each of the bridge portals other than the cycle monster portal includes:

a modulo N μs counter which receives the cycle counter output of the respective cycle clock subsystem and which produces a timing signal every N μs in response thereto, where N is a value specified by a prescribed bus protocol;
a state machine which produces a channel request signal in response to the timing signal;
a physical layer which receives the channel request signal and which produces, in response thereto, a channel available signal upon determining that a wireless communication channel used by the wireless switching system is available, wherein the state machine receives the channel available signal and produces a packet header and an enable signal in response to the channel available signal;
a register which has a first input which receives the cycle counter output of the respective cycle clock subsystem and a second input which receives the enable signal, whereby the register outputs a bus_time data block in response to the enable signal, the bus_time data block being indicative of a current bus time; and,
wherein the packet header and the bus_time data block together comprise a cycle_start packet which is transmitted by the respective wireless switching subsystem.

12. The bus bridge as set forth in claim 11, wherein each of the wireless switching subsystems coupled to the bridge portals other than the cycle monster portals includes:
a wireless physical layer which receives a cycle_start packet from its respective bridge portal;
a decoding section which decodes the packet header of the cycle_start packet and which outputs a decode signal indicative of receipt of the cycle_start packet;
a processing delay section which determines a processing time required to decode the cycle_start packet, and which outputs a processing delay time output indicative of the determined processing time,
a delay element which delays the decode signal by the processing delay time and which outputs a load signal;
a register which receives the bus_time data block and which produces a register output indicative of the current bus time;
an adder which sums the processing delay time output and the register output, and which outputs the sum; and,
wherein the cycle counter of the respective cycle clock subsystem receives the load signal and the sum is loaded into the cycle counter of the respective cycle clock subsystem in response to the load signal.

13. The bus bridge as set forth in claim 1, wherein each of the switching subsystems is a wireless switching subsystem and the switching system is a wireless switching system which utilizes a frame synchronization protocol.

14. The bus bridge as set forth in claim 13, wherein the wireless switching subsystem coupled to the cycle monster portal includes:
a modulo W μs counter which receives the cycle counter output of the respective cycle clock subsystem and which produces a timing signal every W μs, where W is a frame time specified by the frame synchronization protocol;
a state machine which produces a channel request signal in response to the timing signal;
a wireless physical layer which receives the channel request signal and which produces, in response thereto, a channel available signal upon determining that a wireless communication channel used by the wireless switching system is available, wherein the state machine receives the channel available signal and produces a packet header and an enable signal in response to the channel available signal;

a register which has a first input which receives the cycle counter output of the respective cycle clock subsystem and a second input which receives the enable signal, whereby the register outputs a bus_time data block in response to the enable signal, the bus_time data block being indicative of a current bus time; and, wherein the packet header and the bus_time data block together comprise a cycle_start packet which is transmitted by the wireless switching subsystem.

15. The bus bridge as set forth in claim 14, wherein the cycle monster portal includes:

a physical layer which receives the cycle_start packet from its respective switching subsystem;

a decoding section which decodes the packet header of the cycle_start packet and which outputs a decode signal indicative of receipt of the cycle_start packet;

a processing delay section which determines a processing time required to decode the cycle_start packet, and which outputs a processing delay time output indicative of the determined processing time, a delay element which delays the decode signal by the processing delay time and which outputs a load signal;

a register which receives the bus_time data block and which produces a register output indicative of the current bus_time;

an adder which sums the processing delay time output and the register output, and which outputs the sum; and, wherein the cycle counter of the respective cycle clock subsystem receives the load signal and the sum is loaded into the cycle counter of the respective cycle clock subsystem in response to the load signal.

16. The bus bridge as set forth in claim 15, wherein each of the bridge portals other than the cycle monster portal includes:

a modulo N $\mu$s counter which receives the cycle counter output of the respective cycle clock subsystem and which produces a timing signal every N $\mu$s in response thereto, where N is a value specified by a prescribed bus protocol;

a state machine which produces a channel request signal in response to the timing signal;

a physical layer which receives the channel request signal and which produces, in response thereto, a channel available signal upon determining that a wireless communication channel used by the wireless switching system is available, wherein the state machine receives the channel available signal and produces a packet header and an enable signal in response to the channel available signal;

a register which has a first input which receives the cycle counter output of the respective cycle clock subsystem and a second input which receives the enable signal, whereby the register outputs a bus_time data block in response to the enable signal, the bus_time data block being indicative of a current bus time; and, wherein the packet header and the bus_time data block together comprise a cycle_start packet which is transmitted by the respective wireless switching subsystem.

17. The bus bridge as set forth in claim 16, wherein each of the wireless switching subsystems coupled to the bridge portals other than the cycle monster portals includes:

a wireless physical layer which receives a cycle_start packet from its respective bridge portal;

a decoding section which decodes the packet header of the cycle_start packet and which outputs a decode signal indicative of receipt of the cycle_start packet;

a processing delay section which determines a processing time required to decode the cycle_start packet, and which outputs a processing delay time output indicative of the determined processing time, a delay element which delays the decode signal by the processing delay time and which outputs a load signal;

a register which receives the bus_time data block and which produces a register output indicative of the current bus_time;

an adder which sums the processing delay time output and the register output, and which outputs the sum; and, wherein the cycle counter of the respective cycle clock subsystem receives the load signal and the sum is loaded into the cycle counter of the respective cycle clock subsystem in response to the load signal.

18. The bus bridge as set forth in claim 13, wherein the wireless switching subsystem coupled to the cycle monster portal includes:

a modulo W $\mu$s counter which receives the cycle counter output of the respective cycle clock subsystem and which produces a first timing signal every W $\mu$s, where W is a frame time specified by the frame synchronization protocol;

a first state machine which produces a first channel request signal in response to the first timing signal;

a wireless physical layer which receives the first channel request signal and which produces, in response thereto, a first channel available signal upon determining that a wireless communication channel used by the wireless switching system is available, wherein the first state machine receives the first channel available signal and produces a first packet header and a first enable signal in response to the first channel available signal;

a first register which has a first input which receives the cycle counter output of the respective cycle clock subsystem and a second input which receives the first enable signal, whereby the first register outputs a first bus_time data block in response to the first enable signal, the first bus_time data block being indicative of a current bus time; and, wherein the first packet header and the first bus_time data block together comprise a first cycle_start packet which is transmitted by the wireless switching subsystem.

19. The bus bridge as set forth in claim 13, wherein the wireless switching subsystem coupled to the cycle monster portal includes:

a modulo W $\mu$s counter which receives the cycle counter output of the respective cycle clock subsystem and which produces a timing signal every W $\mu$s, where W is a frame time specified by the frame synchronization protocol;

a state machine which produces a channel request signal in response to the timing signal;

a comparison circuit which compares prescribed lower significant bits of the cycle counter output of the respective cycle clock subsystem to a preset value, and which outputs a trigger signal upon detecting an equality;

a wireless physical layer which receives the channel request signal and which produces, in response thereto, a channel available signal upon determining that a wireless communication channel used by the wireless switching system is available, wherein the state machine receives the channel available signal and produces a packet header and an enable signal in response to receipt of both the channel available signal and the trigger signal;

a register which has a first input which receives the cycle counter output of the respective cycle clock subsystem and a second input which receives the enable signal, whereby the register outputs a bus_time data block in response to the enable signal, the bus_time data block being indicative of a current bus time; and, wherein the packet header and the bus_time data block together comprise a cycle_start packet which is transmitted by the respective wireless switching subsystem.

20. The bus bridge as set forth in claim 19, wherein each of the switching subsystems coupled to the bridge portals other than the cycle monster portal include:

a physical layer which receives the cycle_start packet from its respective bridge portal;

a decoding section which decodes the packet header of the cycle_start packet and which outputs a decode signal indicative of receipt of the cycle_start packet;

a processing delay section which determines a processing time required to decode the cycle_start packet, and which outputs a processing delay time output indicative of the determined processing time, a delay element which delays the decode signal by the processing delay time and which outputs a load signal;

a register which receives the bus_time data block and which produces a register output indicative of the current bus_time;

a preset value circuit which stores and outputs the preset value;

an adder which sums the processing delay time output and the register output, and which outputs the sum; and, wherein the cycle counter of the respective cycle clock subsystem receives the load signal and the sum and the preset value are loaded into the cycle counter of the respective cycle clock subsystem in response to the load signal.

21. The bus bridge as set forth in claim 1, wherein the cycle monster portal includes:

a modulo N $\mu$s counter which receives the cycle counter output of the respective cycle clock subsystem and which produces a second timing signal every N $\mu$s in response thereto, where N is a value specified by a prescribed bus protocol;

a second state machine which produces a second enable signal in response to the second timing signal; and, a second register which has a first input which receives the cycle counter output of the respective cycle clock subsystem and a second input which receives the second enable signal, whereby the second register outputs a second bus_time data block in response to the second enable signal, the second bus_time data block being indicative of a current bus time.

22. The bus bridge as set forth in claim 21, wherein each of the bridge portals other than the cycle monster portal includes:

a modulo N $\mu$s counter which receives the cycle counter output of the respective cycle clock subsystem and which produces a timing signal every N $\mu$s in response thereto, where N is a value specified by a prescribed bus protocol;

a state machine which produces a channel request signal in response to the timing signal;

a physical layer which receives the channel request signal and which produces, in response thereto, a channel available signal upon determining that a wireless communication channel used by the wireless switching system is available, wherein the state machine receives the channel available signal and produces a packet header and an enable signal in response to the channel available signal;

a register which has a first input which receives the cycle counter output of the respective cycle clock subsystem and a second input which receives the enable signal, whereby the register outputs a bus_time data block in response to the enable signal, the bus_time data block being indicative of a current bus time; and, wherein the packet header and the bus_time data block together comprise a cycle_start packet which is transmitted by the respective wireless switching subsystem.

23. The bus bridge as set forth in claim 22, wherein each of the wireless switching subsystems coupled to the bridge portals other than the cycle monster portals includes:

a wireless physical layer which receives a cycle_start packet from its respective bridge portal;

a decoding section which decodes the packet header of the cycle_start packet and which outputs a decode signal indicative of receipt of the cycle_start packet;

a processing delay section which determines a processing time required to decode the cycle_start packet, and which outputs a processing delay time output indicative of the determined processing time, a delay element which delays the decode signal by the processing delay time and which outputs a load signal;

a register which receives the bus_time data block and which produces a register output indicative of the current bus_time;

an adder which sums the processing delay time output and the register output, and which outputs the sum; and, wherein the cycle counter of the respective cycle clock subsystem receives the load signal and the sum is loaded into the cycle counter of the respective cycle clock subsystem in response to the load signal.

24. The bus bridge as set forth in claim 1, wherein the switching subsystem coupled to the cycle monster portal includes:

a modulo W $\mu$s counter which receives the cycle counter output of the respective cycle clock subsystem and which produces a timing signal every W $\mu$s, where W is a frame time specified by the frame synchronization protocol;

a state machine which produces a channel request signal in response to the timing signal;

a comparison circuit which compares prescribed lower significant bits of the cycle counter output to a preset value, and which outputs a trigger signal upon detecting an equality;

a physical layer which receives the channel request signal and which produces, in response thereto, a channel available signal upon determining that a communication channel used by the switching system is available, wherein the state machine receives the channel available signal and produces a packet header and an enable signal in response to receipt of both the channel available signal and the trigger signal;

a register which has a first input which receives the cycle counter output of the respective cycle clock subsystem and a second input which receives the enable signal, whereby the register outputs a bus_time data block in response to the enable signal, the bus_time data block being indicative of a current bus time; and, wherein the packet header and the bus_time data block together comprise a cycle_start packet which is transmitted by the respective switching subsystem.

25. The bus bridge as set forth in claim 24, wherein each of the switching subsystems coupled to the bridge portals other than the cycle monster portal include:

a physical layer which receives the cycle_start packet from its respective bridge portal;

a decoding section which decodes the packet header of the cycle_start packet and which outputs a decode signal indicative of receipt of the cycle_start packet;

a processing delay section which determines a processing time required to decode the cycle_start packet, and which outputs a processing delay time output indicative of the determined processing time, a delay element which delays the decode signal by the processing delay time and which outputs a load signal;

a register which receives the bus_time data block and which produces a register output indicative of the current bus_time;

a preset value circuit which stores and outputs the preset value;

an adder which sums the processing delay time output and the register output, and which outputs the sum; and, wherein the cycle counter of the respective cycle clock subsystem receives the load signal and the sum and the preset value are loaded into the cycle counter of the respective cycle clock subsystem in response to the load signal.

26. A method for distributing a cycle clock in a bus bridge which includes a plurality of buses and bridge portals, each bridge portal being coupled to a respective one of the buses, and which further includes a plurality of switching subsystems respectively coupled to respective ones of the bridge portals, the plurality of switching subsystems collectively forming a switching system which interconnects the plurality of bridge portals; said method comprising the steps of:

at each bridge portal, generating a cycle clock;

at each bridge portal, using a cycle counter to produce a cycle count output; and using the cycle count output to produce a common timing reference for both the bridge portal and the respective switching subsystem coupled thereto.

27. The method as set forth in claim 26, wherein:

the bus bridge is a serial bus bridge;

each of the buses is a serial local bus; and, each of the bridge portals is a node on its respective serial local bus.

* * * * *